(12) United States Patent
Teymourian

(10) Patent No.: US 11,928,327 B2
(45) Date of Patent: Mar. 12, 2024

(54) ENHANCED TOUCH SENSITIVE SELECTION

(71) Applicant: Patmos Unipessoal LDA, Madeira (PT)

(72) Inventor: Amir Teymourian, Bremen (DE)

(73) Assignee: Patmos, Unipessoal LDA, Funchal (PT)

( * ) Notice: Subject to any disclaimer, the term of this patent is extended or adjusted under 35 U.S.C. 154(b) by 0 days.

(21) Appl. No.: 17/262,887

(22) PCT Filed: Jul. 26, 2018

(86) PCT No.: PCT/IB2018/055608
§ 371 (c)(1),
(2) Date: Jan. 25, 2021

(87) PCT Pub. No.: WO2020/021313
PCT Pub. Date: Jan. 30, 2020

(65) Prior Publication Data
US 2021/0149560 A1 May 20, 2021

(51) Int. Cl.
*G06F 3/04883* (2022.01)
*G06F 3/0482* (2013.01)

(52) U.S. Cl.
CPC ........ *G06F 3/04883* (2013.01); *G06F 3/0482* (2013.01)

(58) Field of Classification Search
CPC . G06F 3/04883; G06F 3/0482; G06F 3/04842
See application file for complete search history.

(56) References Cited

U.S. PATENT DOCUMENTS

| 10,613,732 B2* | 4/2020 | Coin-Perard | G06F 3/04883 |
| 2005/0210399 A1* | 9/2005 | Filner | G06F 3/0481 715/767 |
| 2010/0137031 A1* | 6/2010 | Griffin | G06F 3/0488 455/566 |
| 2011/0283188 A1* | 11/2011 | Farrenkopf | G06F 3/0488 715/833 |
| 2012/0030566 A1* | 2/2012 | Victor | G06F 3/04883 715/702 |

(Continued)

OTHER PUBLICATIONS

International Search Report dated Feb. 21, 2019, issued in PCT Application No. PCT/IB2018/055608, filed Jul. 26, 2018.

(Continued)

*Primary Examiner* — Jennifer N Welch
*Assistant Examiner* — Ashley M Fortino
(74) *Attorney, Agent, or Firm* — Workman Nydegger

(57) ABSTRACT

The present invention relates to a method, an electronic device, an electronic handheld device and a computer program product and is in particular related to a touch sensitive selection of objects, which are displayed on a touch sensitive display of an electronic device by proposing a highlighting mode for selectable objects in order to jump/scroll and highlight one of the selectable objects for a subsequent selection, wherein the highlighting and selection is performed at a different position than the position of the selectable objects in order to make a selection of displayed objects, which are positioned far from the interaction area of a user, in particular far form the fingers of the user possible and to enhance the user interaction.

15 Claims, 6 Drawing Sheets

(56) References Cited

U.S. PATENT DOCUMENTS

| | | |
|---|---|---|
| 2014/0040826 A1 | 2/2014 | Wei et al. |
| 2015/0169141 A1 | 6/2015 | Kim et al. |
| 2016/0110056 A1 | 4/2016 | Hong et al. |
| 2016/0196041 A1* | 7/2016 | Lavoie ................ G06F 3/04883 |
| | | 715/822 |
| 2017/0068416 A1 | 3/2017 | Li |

OTHER PUBLICATIONS

Written Opinion dated Feb. 21, 2019, issued in PCT Application No. PCT/IB2018/055608, filed Jul. 26, 2018.

* cited by examiner

[Fig. 1]
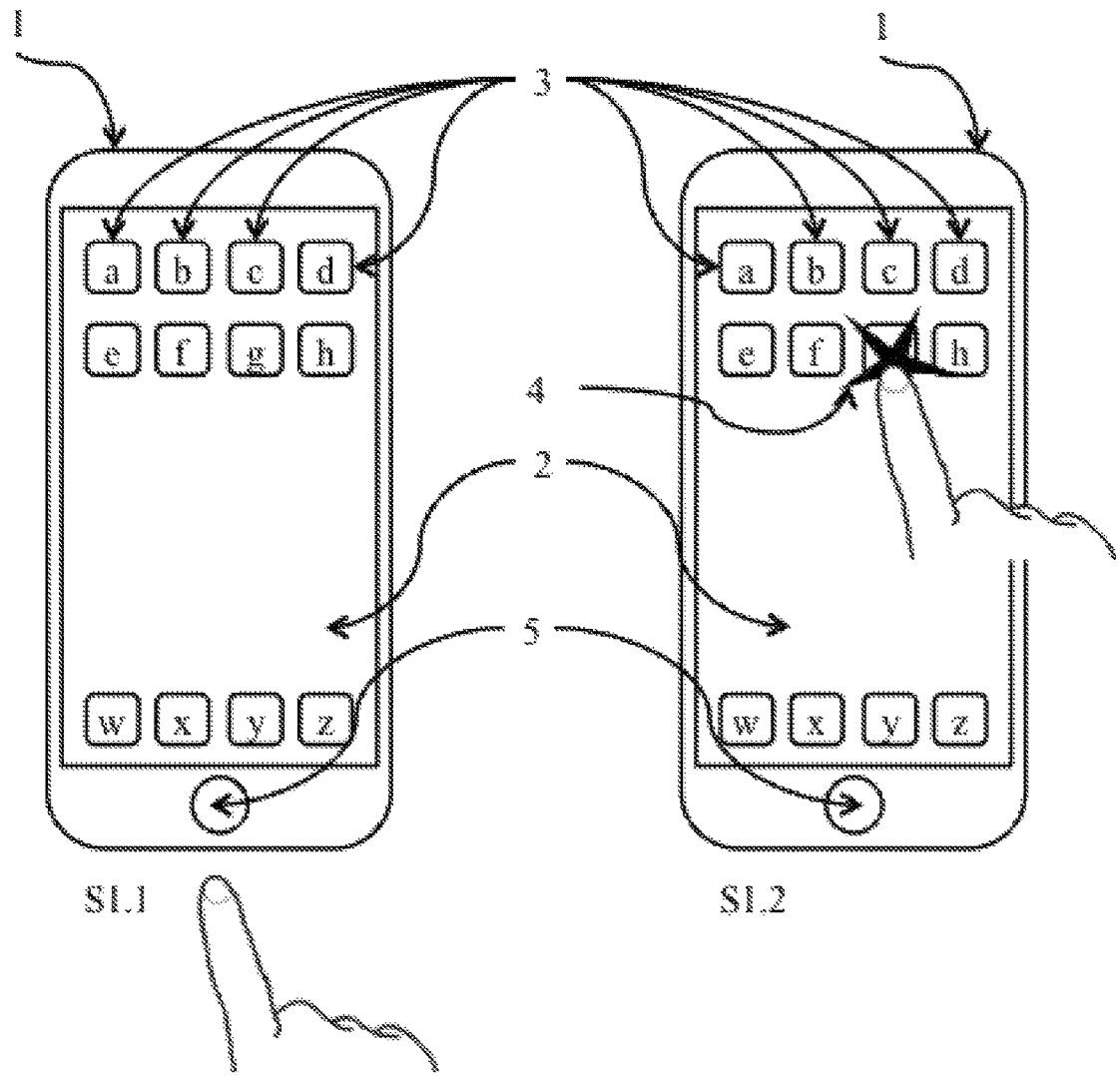

[Fig. 2]
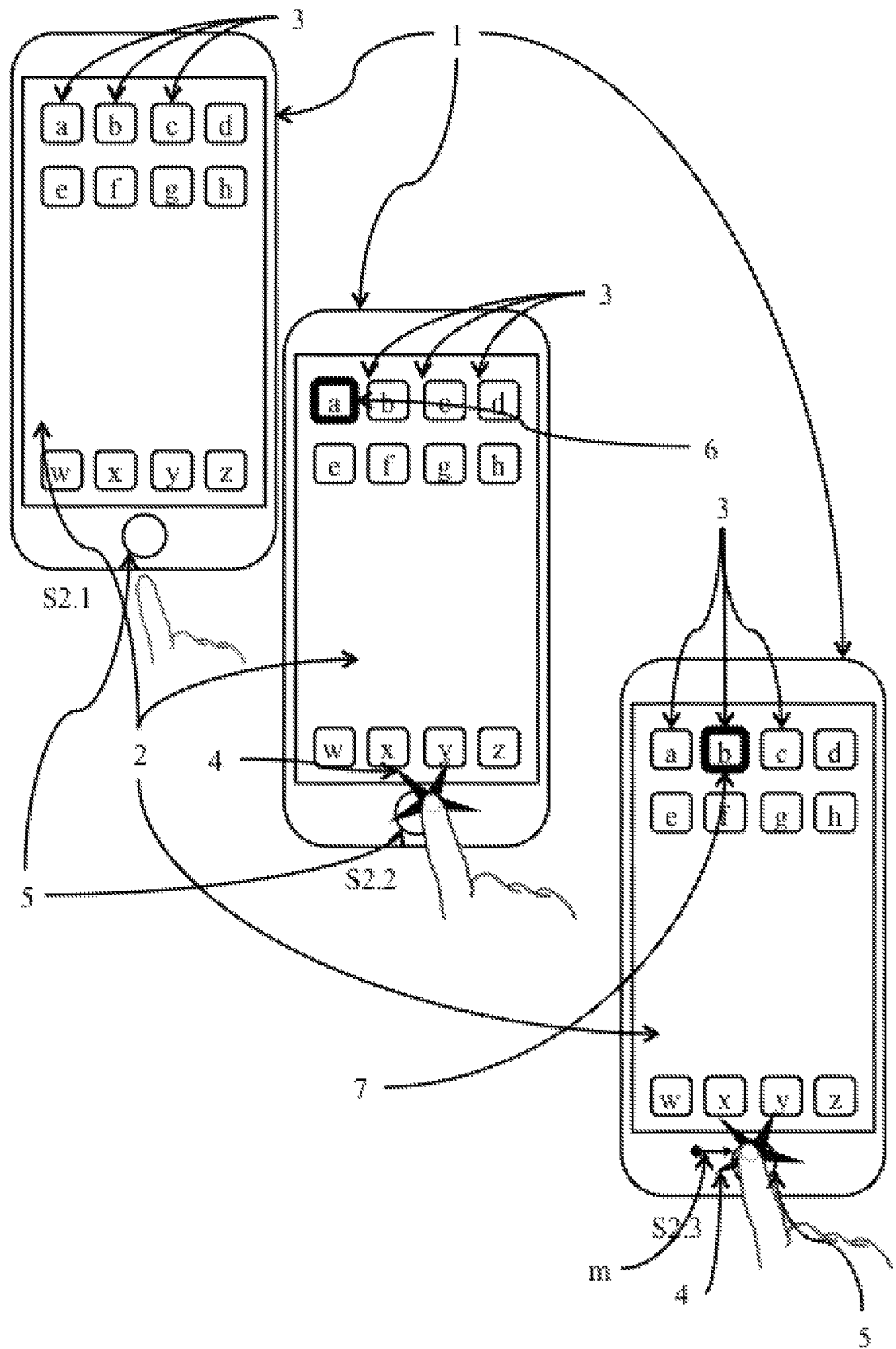

[Fig. 3]
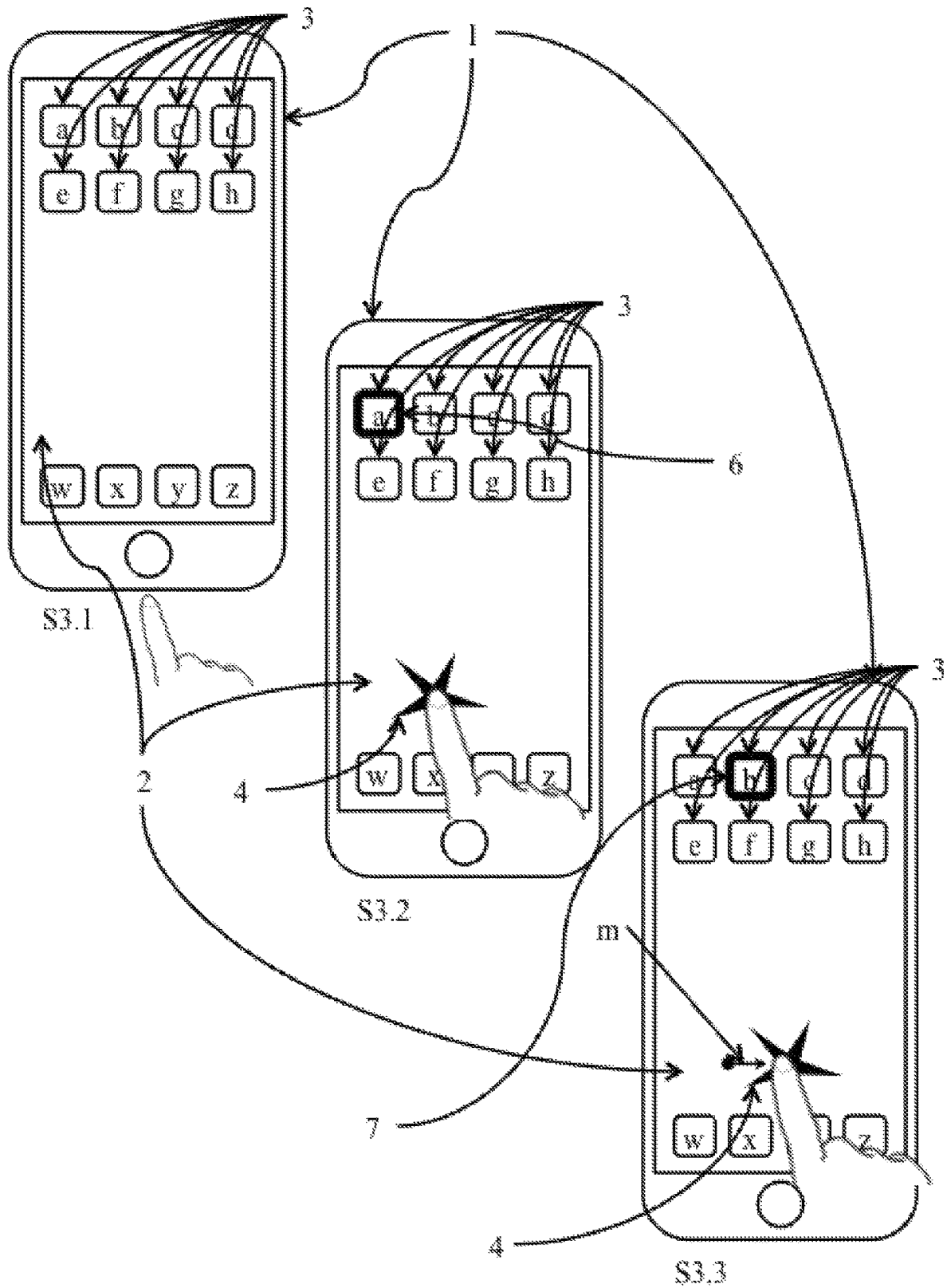

[Fig. 4]
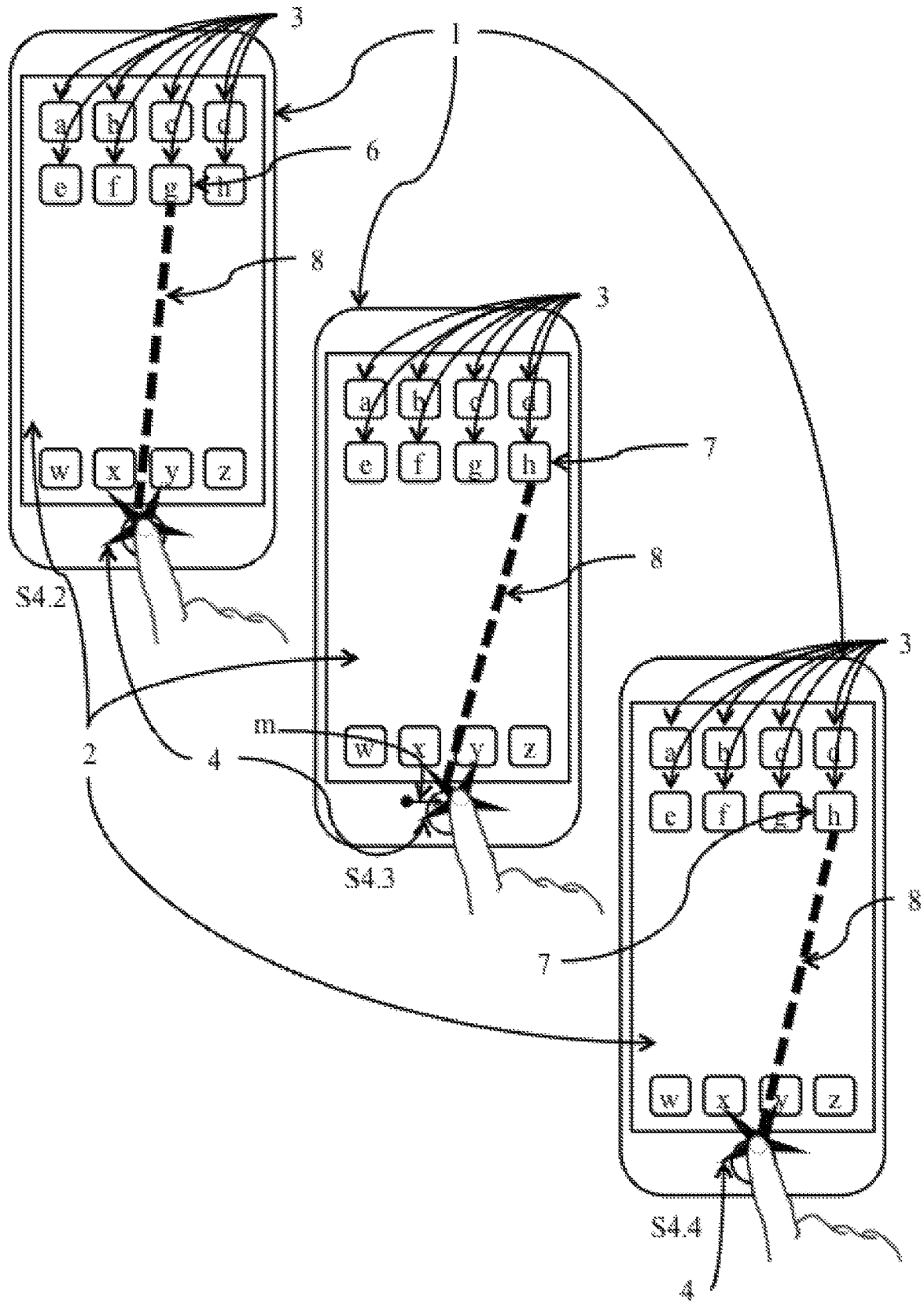

[Fig. 5]
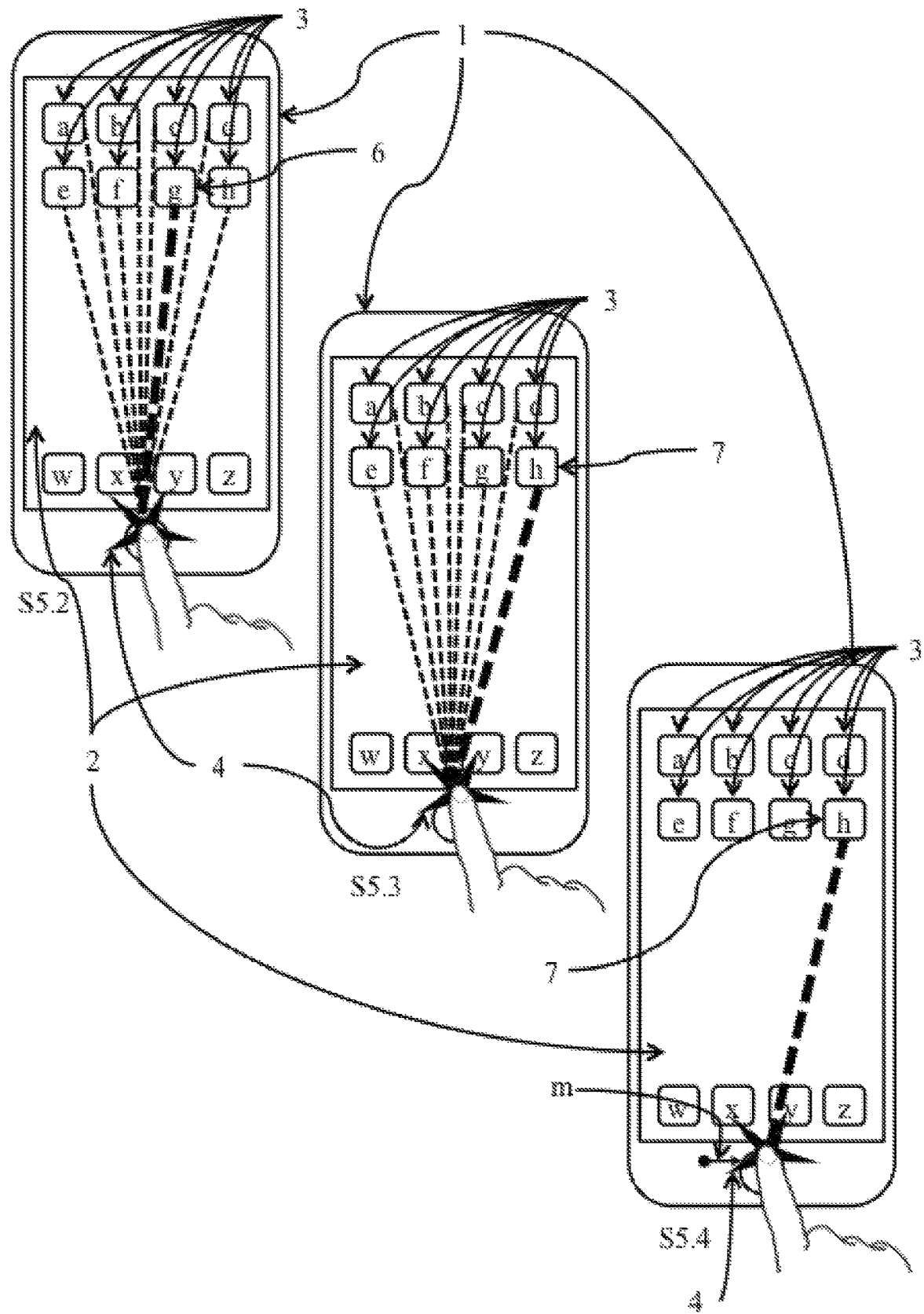

[Fig. 6]
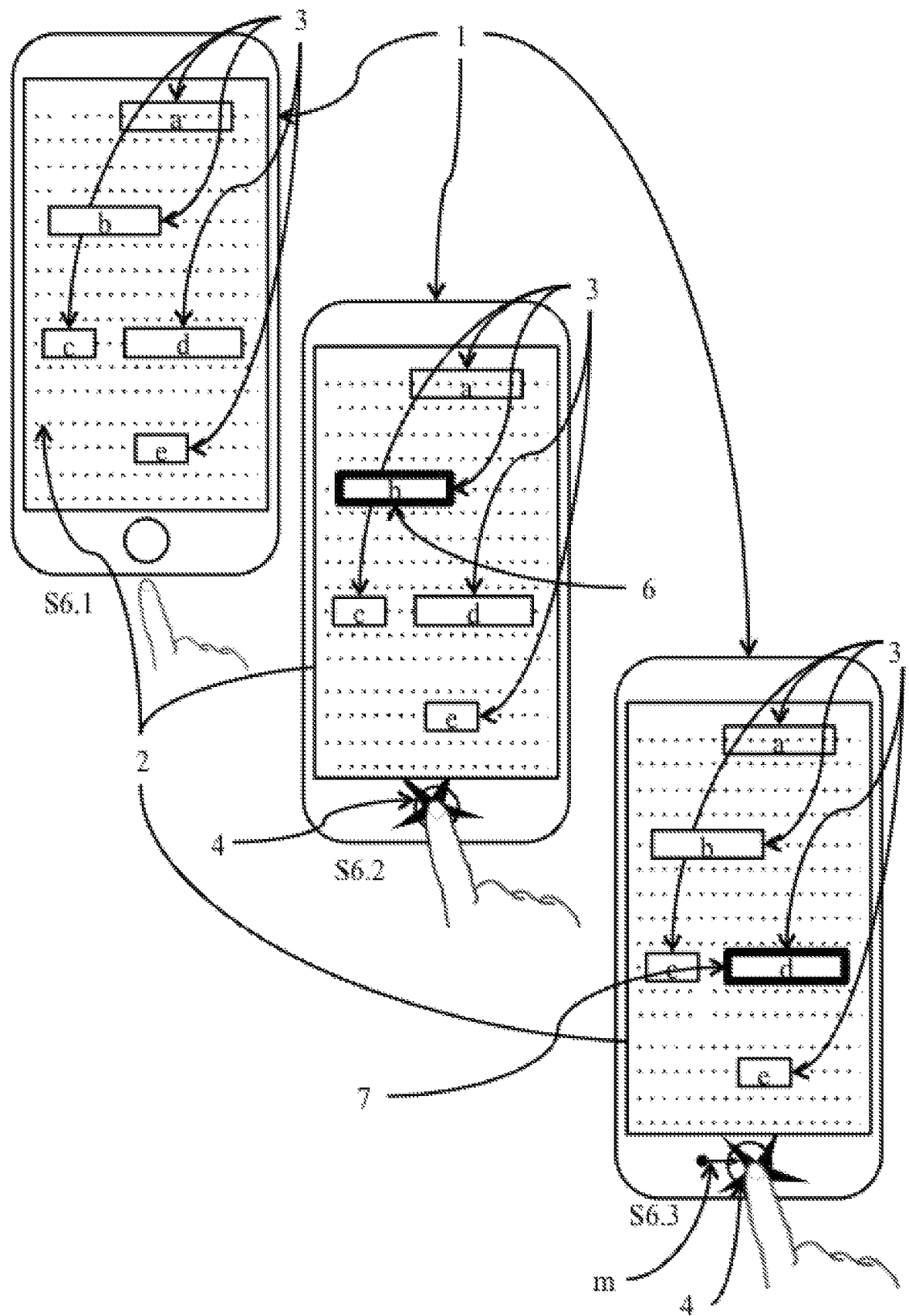

ENHANCED TOUCH SENSITIVE SELECTION

TECHNICAL FIELD

The invention relates to a method, an electronic device, an electronic handheld device and a computer program product and is in particular related to a touch sensitive selection of objects, which are displayed on a touch sensitive display of an electronic device.

BACKGROUND ART

According to the state of the art a selection of objects such as program icons or symbols representing software applications, hereinafter referred to as app, a selection of input fields or any selectable object that is displayed on a touch sensitive display of an electronic device is performed by a touch command at a position of the aforementioned objects, which is the at which the objects on the touch sensitive display are displayed.

Some smartphones provides the functionality, that after a certain user command, apps that are displayed on an upper area of a touch sensitive display are shifted to a lower area of the touch sensitive display to bring them closer to the fingers of a user for a selection. The aforementioned approach is connected to a step of hiding and not displaying of other apps, which were displayed on a lower area of the touch sensitive display before, with the consequence that the hidden apps are not selectable anymore in the time period of shifting to the lower area of the touch sensitive display. For a selection of the hidden apps the shifting command has to be performed again to shift back and display the hidden apps again in order to make them selectable again.

SUMMARY OF INVENTION

The present invention aims to solve problems with regard to the aforementioned limited functionalities related to a touch sensitive selection of displayed objects on a touch sensitive display. The present invention solve the related problems by providing a method, an electronic device, an electronic handheld device and a computer program product for an enhanced touch sensitive selection of objects on the touch sensitive display. The present invention aims in particular to provide an alternative method for a touch sensitive selection for selection of displayed objects on a touch sensitive display. Further the present invention aims to provide an electronic handheld device having a touch sensitive display with an alternative selection capability for selection of displayed objects on a touch sensitive display of the electronic handheld device according to the present invention. The present invention aims also to provide a computer program product as an additional element to realize the touch sensitive selection of displayed object on a touch sensitive display, wherein the computer program product can be realized as an standalone computer program product or as an added software element cooperating with an operating system of a computer.

According to a first main aspect of the present invention it is proposed a method to perform a selection on a touch sensitive handheld electronic device having a touch sensitive display, whereby the method comprising: a) displaying at least one selectable object on said touch sensitive display, wherein said at least one selectable object is selectable through a touch command at a position of said at least one selectable object on said touch sensitive display, b) receiving a first touch command from a touch sensitive area of said handheld device to enter a highlighting mode to highlight one of said at least one selectable objects and displaying said highlighted selectable object, wherein a position of said first touch command is different than a position of said highlighted selectable object, c) receiving a second touch command from said touch sensitive area of said handheld device to select said highlighted selectable object, or to jump to another selectable object and to highlight a different selectable object than said highlighted selectable object and displaying said highlighted different selectable object and to select said highlighted different selectable object after receiving a third touch command. Here as an alternative the position of said second touch command and/or the position of said third touch command on said touch sensitive area or on said touch sensitive display can be different from the position of said highlighted object and/or can be different from the position of said highlighted different selectable object.

According to the above said first main aspect of the present invention the selectable objects are displayed on the touch sensitive display, wherein the term object alone or as a selectable object is to be understood as a program icon, an app icon, an input box, an input field, an information displayed in a row, an information displayed in a column, an email, a link or a reference. The object can be any type of displayed information that can be selected through a touch command depending on currently running application on the electronic device. So an object while displaying a webpage can be hyperlinks displayed on the webpage, which can be selected or in case of an email organizing software can be emails, that are displayed in an specific order such as line-by-line and each email can be selected for displaying the content of the each selected email.

According to the above said first main aspect of the present invention after receiving the first touch command a highlighting mode is entered, wherein in the highlighting mode one of the selectable objects is highlighted and the highlighting of the selectable object is displayed, which means that the already highlighted selectable object is ready for a selection after performing a second touch command. Further it is to be noted that a position of the first touch command is different than the position of said highlighted selectable object, so in contrast to the state of the art the first touch command is not performed at the same position at which the selectable object is displayed but at a different position as an alternative is provided and further in contrast to the state of the art the selectable object is highlighted before a selection takes place and is not selected immediately without highlighting. In this way one selectable object according to the present invention is highlighted first and in a second step a selection can be performed. A selection of the highlighted selectable object can also be performed after waiting for a specific and predetermined period of time, whereby in this case the first touch command for highlighting is already comprising the second touch command as a type of touch command with a waiting phase and if the waiting phase is over the highlighted object is selected automatically.

Further according to the above said first main aspect of the present invention the second touch command is also used to jump to another selectable object and to highlight a different selectable object than the previously highlighted selectable object, which means that in case of having more than one selectable object it is possible to jump or in other words to go to a different selectable object for highlighting and in a next step to perform the selection of the different selectable object. The aforementioned jumping is to be understood as a stepwise jump to a second selectable object, a third selectable object and so on for highlighting one of the available selectable objects displayed on the touch sensitive display. In addition it can also provide a jump to any of the previously highlighted objects in order to enable the highlighting of the selectable objects in both directions.

Further it should be noted that the invention foresees also the usage of different types of touch commands for the aforementioned touch commands such as for the first touch command, the second touch command and the third touch command or to dedicate different type of touch commands for jumping through the selectable objects for highlighting and for selecting of the highlighted selectable object. For example a first touch and hold command can be used to enter the highlighting mode, a further movement on the touch sensitive area while keep on holding can be used to jump to a different selectable object for highlighting and after highlighting the desired touch command a tap or alternatively the holding for a predefined period of time can be used as a further touch command such as for the second touch command to select the highlighted selectable object. In general, the term touch command used in the present application is to be understood as a generic term for a touch sensitive command, which can include a combination of at least one touch on the touch sensitive area, wherein any one of the at least one touch commands can have an specific time duration, further, any one of the at least one touch commands can be performed with an sliding/swiping/displacing on the touch sensitive area having at least one specific direction, wherein the touch command can be performed by means of at least one finger simultaneously or with a time offset between the usage of the finger for a touch command. It should be noted that the term touch sensitive area in the present application is to be understood as both regions, namely the touch sensitive display and a touch sensitive surface around the touch sensitive display on the electronic device, which leads to at least two different embodiments with regard to performing the first touch command on the touch sensitive display or on the touch sensitive surface around the touch sensitive display on the electronic device.

In accordance to the above described first main aspect of the present invention it is possible to use the touch command on the touch sensitive area in order to highlight at least one selectable object or to go to other selectable objects for highlighting and to select one of the aforementioned highlighted objects without the need to touch the selectable object itself at its displayed position on the touch sensitive display, but at a different position than the position of the displaying of the selectable object. In this way the present invention provides the advantageous effect of being able to select the object at the position where the touch command is performed and not where the object is positioned. Through this it is possible to provide an advantageous selection method and to select a displayed object regardless of its position on the touch sensitive display, in particular objects being placed far from the users fingers are selectable and all of them remain selectable.

In contrast and according to the state of the art a touch command has to be performed at the same position of the displayed object, for which the user has to move all the way to the selectable object itself for a selection, so that according to the present invention a shorter selection trajectory for selection is provided and the necessary time for interaction with the device is reduced.

Further according to the shifting approach in accordance with the state of the art the present invention provides the advantageous effect, that all of the selectable objects remain selectable, because they are not hidden due to the shifting.

In addition the present invention provides the advantageous effect of shortening the trajectory of user movements, since devices having the touch sensitive displays such as smartphones and tablet pc's are becoming bigger in size, while forcing the user to move back and forth over large distances across the touch sensitive display to perform touch commands, select objects and to interact with the device.

According to another advantageous effect, the present invention provides the possibility that handheld devices can be used in a more convenient way, because all of the selectable objects can be selected while holding the device with only one hand and there is no need to use the second hand to perform a touch command on the touch sensitive display, when a selectable object is placed far from the possible action area of the fingers of the only one holding hand.

According to still another advantageous effect of the present invention the selectable objects are selectable with a higher accuracy while a touch command for a selection is performed, in particular when a high number of selectable objects are displayed and a touch command at a position of one of the selectable objects according to the sate of the art has a higher probability to lead to a wrong and not intended selection, due to the high number of the selectable objects, which are positioned very close to each other.

In accordance to a further advantageous aspect of the present invention a determination about which one of said selectable objects is initially highlighted depends on said position of said first touch command in order to provide sufficient space for performing further touch commands and to remain within said touch sensitive are or touch sensitive display. Based on this advantageous aspect, after performing the first touch command to enter the highlighting mode, a first selectable object is already highlighted, wherein the determining of which object should be highlighted depends on which position on the touch sensitive area or on the touch sensitive display the first touch command was performed. Through the consideration of the position of the first touch command the borders of the touch sensitive area and touch sensitive display are considered automatically, so that performing a touch command having a sliding part for jumping to other selectable objects for highlighting can still be performed without an interruption, because there is enough remaining space on the touch sensitive area or on the touch sensitive display to perform a shifting of a finger for jumping and highlighting. For instance, if the position of the first touch command is on the right border of the touch sensitive area or on the touch sensitive display, the selectable object having the position on the right border of the touch sensitive display is highlighted or if the position of the first touch command is on the bottom right hand corner of the touch sensitive area or on the touch sensitive display, the selectable object having the position on the bottom right hand corner is highlighted.

According to another aspect of the present invention the touch sensitive area of said handheld device is the touch sensitive display or a touch sensitive surface around said touch sensitive display of the device. In this way both possible touch sensitive portions are subject of the present invention.

According to another aspect the at least one selectable object is determined from a plurality of objects displayed on said touch sensitive display, wherein said determination depends on a distance between said position of said first touch command and each one of said plurality of objects and/or a current usage orientation of said touch sensitive handheld electronic device. According to the aforementioned aspect it is possible to choose from certain objects and to make them selectable and to highlight them according to the present invention. It means that some of the displayed objects can be excluded from being one of the at least selectable objects, which than remains selectable through a touch command at their specific displayed position. Accordingly it is possible to reduce the number of highlightable selectable objects having the advantage of a more simple displaying to avoid a distraction of the user.

According to an additional aspect of the present invention said first touch command, said second touch command or said third touch command is at least one or a combination of the following: a single touch command, a short touch command, a tap, a double tap, a horizontal or vertical scroll, a swipe, a touch and hold, a flick or a press on said touch sensitive display, a gesture and can be performed with at least one finger and/or with a combination of at least two fingers. In general a touch command should be understood as a command, which corresponds to initiation of a certain action. This means that any possible combination of touch commands can be used according to the present invention.

Further according to another aspect of the present invention said highlighting is performed by using distinguishing graphical elements and/or using connecting elements having geometric forms, colors and/or patterns and/or referencing elements and/or through a modified size in order to demonstrate which objects are selectable and/or which one of said selectable objects is highlighted. In general any visual element that can be used to visualize which selectable object is highlighted should be understood as the highlighting according to the present invention.

Based on another advantageous aspect of the present invention at least one of said touch command is performed along a course with at least a portion having a vertical course, a horizontal course, a curved course, a circular course and/or a diagonal course. In this way different type of touch commands are provided, which may comprise different type of courses having one of the aforementioned courses providing the possibility to provide distinct course depending on the distribution of the selectable objects on said touch sensitive display or depending on the position of the touch sensitive area. As an alternative or in addition the aforementioned courses may be also visualized on the touch sensitive display in order to inform the user about a current course or about the predefined course, which may be defined by the user in advance. So that according to this advantageous aspect the course can be visualized by means of graphical elements in order to demonstrate what type of course is provided.

According to another advantageous aspect of the present invention the course visualization provides a magnified view to at least a group from said selectable objects in order to increase an accuracy of said highlighting and selection of said selectable objects. In this way if the magnified view provides the possibility to build a subgroup from the selectable objects in order to jump just through the member of the aforementioned subgroup. The subgroup has a lower number of selectable objects which makes as selection along a given course easier for the user, because a single jump to another object of the subgroup can be performed with less precise touch commands, due to the reduced sensibility based on the magnified view to the group.

In accordance to another advantageous aspect of the present invention said at least one selectable object is a program icon, an app icon, an input box, an input field, an information displayed in a row, an information displayed in a column, an email, a link or a reference. As already stated any object that can be selected on the touch sensitive display through a touch command can be a selectable object.

According to a further advantageous aspect of the present invention the highlighting mode is entered for a first subgroup of said selectable objects and wherein the first touch command has a larger distance to the first subgroup of said selectable objects than to a second subgroup of the selectable objects. In this way the second subgroup positioned closer to the first touch command are not in use for the highlighting mode, because the selectable objects of the second subgroup can be selected directly through a touch command, while a finger is already in a close distance to the selectable objects of the second subgroup. In this way the complexity rate is reduces and a distraction of a user is avoided.

According to a further advantageous aspect of the present invention it is provided a touch sensitive handheld electronic device with a touch sensitive display, wherein the device is adapted to perform one of methods according to one of the previous aspects as described here.

The touch sensitive device or the touch sensitive handheld device is preferably equipped with a casing comprising a digital memory unit, a CPU, a wireless communication unit, a graphic processor unit (GPU), a sound transducer unit, a touch sensitive display and is equipped with a software as operating system for the device. As an alternative the touch sensitive device or the touch sensitive handheld device can have in addition a touch sensitive area other than the touch sensitive display, which is preferably placed at a position around the touch sensitive display. As a further alternative the touch sensitive device or the touch sensitive handheld device can be equipped with at least a button such as a home button and/or side button.

The handheld electronic device according to the present invention can be a smartphone, a tablet pc, a multimedia player, a wearable device, smart watch or a notebook.

According to another advantageous aspect of the present invention it is provided a computer-readable storage medium comprising instructions which, when executed by a computer, cause the computer to carry out a method according to one of the here in this application described aspects. In this way the computer product according to the present invention can be a part of an operating system or can be an additional part as a software that can be loaded to an electronic device to work according to one of the aspects of the present invention.

BRIEF DESCRIPTION OF DRAWINGS

In the following based on the present invention some preferred and non-exclusive embodiments are described with the help of figures.

FIG. 1 illustrates the selection of an object on a touch sensitive display of an electronic device according to the state of the art.

FIG. 2 illustrates the selection of a displayed object on a touch sensitive display of an electronic device according to a first embodiment of the present invention.

FIG. 3 illustrates the selection of a displayed object on a touch sensitive display of an electronic device according to a second embodiment of the present invention.

FIG. 4 illustrates the selection of a displayed object on a touch sensitive display of an electronic device according to a third embodiment of the present invention.

FIG. 5 illustrates the selection of a displayed object on a touch sensitive display of an electronic device according to a fourth embodiment of the present invention.

FIG. 6 illustrates the selection of a displayed object on a touch sensitive display of an electronic device according to a fifth embodiment of the present invention.

DESCRIPTION OF EMBODIMENTS

FIG. 1 illustrates a selection of a selectable object 3 on a touch sensitive display 2 of an electronic device 1 according to the state of the art. FIG. 1 depicts two steps, namely a first step S1.1 and a second step S1.2. In steps S1.1 and S1.2 the touch sensitive display 2 displays a plurality of selectable objects 3, which are labeled with the letters "a", "b", "c", "d", "e", "f", "g", "h" (in the following referred to as "a"-"h") and "w", "x", "y", "z" (in the following referred to as "w"-"z"). The selection according to the state of the art is performed by a touch sensitive command 4, which is indicated with a black star 4, wherein a selection of the selectable object "g" is performed by performing the touch sensitive command 4 at the position of the selectable object "g" as demonstrated in step S1.2. In this way any of the selectable objects "a"-"h" and "w"-"z" can be selected by a touch sensitive command 4 at the position of one of the selectable objects "a"-"h" and "w"-"z". So in accordance to the state of the art it is determined, that any selection of a selectable object has to be performed by a touch command at the position of the desired selectable object.

FIG. 2 illustrates the selection of a selectable object 3, also labeled with the letters "a"-"h" and "w"-"z", on the touch sensitive display 2 according to a first embodiment of the present invention. FIG. 2 demonstrates three steps, namely S2.1, S2.2 and S2.3. The first step S2.1 depicts that a plurality of selectable objects "a"-"h" and "w"-"z" are displayed on the touch sensitive display 2 of the electronic device 1, wherein each of the selectable objects "a"-"h" and "w"-"z" is selectable through a touch command to be performed at a position of displaying of the selectable objects "a"-"h" and "w"-"z" as known from the state of the art. Now according to the present invention in step S2.2 after performing a first touch command 4 at a touch sensitive area 5 symbolized with a circle, which is positioned below of the touch sensitive display 2 and is different than the position of the selectable objects "a"-"h" and "w"-"z" and also different than the touch sensitive display 2, a highlighting mode is entered. After entering the highlighting mode one of the selectable objects is highlighted initially, as demonstrated in FIG. 2 step S2.2 the selectable object labeled with letter "a" is highlighted and is potentially selectable, when a further touch command is performed. In this way after entering the highlighting mode and highlighting the selectable object "a", it is possible to select the highlighted object "a" by performing a second touch command. The mentioned second touch command 4 is one of the touch commands as defined in this description or can be also a waiting period with a predetermined time period after which the highlighted object "a" is selected and for example the application "a" is started (not shown here). As an alternative to the selection of the highlighted object "a" and as demonstrated in FIG. 2 step S2.3 after highlighting the selectable object "a" the second touch command 4 is used to jump to and highlight a different one of the selectable objects "b"-"h" or "w"-"z", namely here the selectable object "b" is highlighted as demonstrated in step S2.3. It is clear that the aforementioned second touch command 4 to select the highlighted object "a" and the second touch command 4 to jump to a different selectable object "b" are of different types in order to distinguish between the two. Further for a better understanding, in FIG. 2 a shift referenced with an arrow "m" indicates a movement of a finger from a position of the finger in step S2.2 to a different position of the finger in step S2.3. It should be noted that the shifting or swiping are just alternatives to highlight a different selectable object and should not be understood as limiting of possible commands. The highlighting of a different selectable object can be performed through any possible touch command as described in this application, such as tapping, touch and hold and sliding on the touch sensitive area. As described and illustrated in FIG. 2, after a jump to another selectable object, namely to the selectable object "b" and highlighting the selectable object "b", the object "b" can be selected after receiving a further command such as third touch command, however the aforementioned selection of object "b" and starting the application "b" is not shown in FIG. 2. As an additional embodiment based on the FIG. 2 and not shown here the highlighting mode is entered just for a subgroup from the selectable objects "a"-"h" and "w"-"z", namely for the subgroup "a"-"h" and not for "w"-"z", because the objects "w"-"z" are close to the position of the first touch command 4 in step S2.2 to enter the highlighting mode. The alternative embodiment to enter the highlighting mode for a subgroup of selectable objects depends on a distance between the first touch command for entering the highlighting mode and a subgroup of selectable objects, wherein the highlighting mode is entered for a subgroup with a larger distance to the position of the first touch command. The aforementioned advantageous aspect can be applied to any of the embodiments described here according to the present invention, such as in the following figures.

FIG. 3 illustrates the selection of a selectable object 3, also labeled with "a"-"h" and "w"-"z", on the touch sensitive display 2 in accordance to a second embodiment of the present invention. The embodiment according to FIG. 3 corresponds to the second embodiment as illustrated in FIG. 2 with the difference that the touch commands 4 are performed on the touch sensitive display 2 and not on a touch sensitive surface around the touch sensitive display 2 like in FIG. 2. In FIG. 3 step S3.1 the selectable objects "a"-"h" and "w"-"z" are displayed on the touch sensitive display 2 and in step S3.2 after performing the first touch command 4 on the touch sensitive display 2 the highlighting mode is entered and one selectable object "a" is highlighted initially, which can be selected after performing the second touch command 4 on the touch sensitive display 2. Alternatively the second touch command 4 can be used to jump to a different selectable object "b" according to step S3.3 and to highlight the selectable object "b". The object "b" can be selected after receiving a further command such as the third touch command, however the aforementioned selection of object "b" and starting the application "b" is not shown in FIG. 3. Also here it should be clear that the aforementioned second touch command 4 to select the highlighted object "a" and the second touch command 4 to jump to the different selectable object "b" are of different types in order to distinguish between the two.

FIG. 4 illustrates the selection of a selectable object 3, also labeled with the letters "a"-"h", on the touch sensitive display 2 according to a third embodiment of the present invention. According to FIG. 4 three steps S4.2, S4.3 and S4.4 are demonstrated. The initial status before entering the highlighting mode similar to the step S2.2 in FIG. 2 and to the step S3.1 in FIG. 3 is not shown, namely that a plurality of selectable objects "a"-"h" and "w"-"z" are displayed on the touch sensitive display 2 of the electronic device 1, wherein each of the selectable objects "a"-"h" and "w"-"z" is selectable through a touch command to be performed at a position of displaying of the selectable objects "a"-"h" and "w"-"z" as known from the state of the art. According to FIG. 4 in step S4.2 after performing the first touch command 4 at a touch sensitive area 5 symbolized with a circle, which is positioned below the touch sensitive display 2 and is different than the position of the selectable objects "a"-"h" and "w"-"z" and also different than the touch sensitive display 2, a highlighting mode is entered. After entering the highlighting mode a graphical element 8 as a broken line 8 is displayed to highlight the selectable object "g" for indicating that the selectable object "g" is initially highlighted and is potentially selectable, when a second touch command 4 is performed. The mentioned second touch command 4 is one of the touch commands as defined in this description or can be also a waiting period with a predetermined time period after which the highlighted object "g" is selected and for example the application "g" is started (not shown here). In step S4.2 the initially highlighted object "g" can be selected by performing a touch command combined with a movement towards the highlighted object "g" (not shown). As an alternative to the selection of the highlighted object "g" and as demonstrated in FIG. 4 step S4.2 after highlighting the selectable object "g" the second touch command 4 is used to jump to and to highlight a different one of the selectable objects "a"-"f" or "h", namely here the selectable object "h" as demonstrated in step S4.3. Also here it should be clear that the aforementioned second touch command 4 to select the highlighted object "g" and the second touch command 4 to jump to a different selectable object "h" are of different types in order to distinguish between the two. For a better understanding, in FIG. 4 step S4.3 a shift from left to right referenced with an arrow "m" indicates a movement of a finger from a position of the finger in step S4.2 to a different position of the finger in step S4.3. As illustrated in FIG. 4, after a jump to another selectable object, namely to the selectable object "h" and highlighting the selectable object "h", the object "h" can be selected after receiving a further command such as a third touch command 4. According to the step S4.4 the third touch command 4 is performed by using a touch command combined with a movement towards the highlighted object "h", however the opening of the object "h" and starting the application "h" is not shown in FIG. 4.

Based on FIG. 4 and FIG. 3 an alternative embodiment of the present invention is to perform the touch commands shown in FIG. 4 on the touch sensitive display 2 as demonstrated in FIG. 3, wherein as described for FIG. 4 the graphical element 8 is displayed on the touch sensitive display 2, wherein the starting position of the graphical element 8 presented as the broken line 8 is the position of the first touch command 4 on the touch sensitive display 2. In other words the broken line 8 according to this embodiment is between the position of the first touch command 4 on the touch sensitive display 2 and the highlighted object "g".

FIG. 5 illustrates the selection of a selectable object 3, also labeled with the letters "a"-"h", on the touch sensitive display 2 according to a fourth embodiment of the present invention. The embodiment according to FIG. 5 is similar to the embodiment of the FIG. 4 as described above, whereby some additional elements are provided for the selection. According to step S5.2 after entering the highlighting mode like in FIG. 4 additional graphical elements here as broken lines depicted in a different way than the broken line highlighting the object "g". In this way other selectable objects "a"-"f" and "h", which are available for the highlighting mode are demonstrated. In this way it is further demonstrated, in which directions, namely left or right a jump to other highlightable objects can be performed. Similar to the embodiment of FIG. 4 a different object, namely "h" can be highlighted in step S5.3. Here for further explanations it can be referred to the above description of FIG. 4.

Based on FIG. 5 and FIG. 3 an alternative embodiment of the present invention is to perform the touch commands shown in FIG. 5 on the touch sensitive display 2 as demonstrated in FIG. 3, wherein as described for FIG. 5 the graphical element 8 and the additional elements are provided for the selection, which are displayed on the touch sensitive display 2, wherein the position of the graphical element 8 for highlighting and the additional elements for demonstrating the highlightable objects is between the position of the first touch command 4 on the touch sensitive display 2 to each object "a"-"h". In other words this embodiment is similar to the embodiment of FIG. 5 with the difference that the starting point of the graphical elements 8 as bold broken line and the additional elements as thin broken lines are shifted to a position on the touch sensitive display 2, while the endpoints of the bold broken line and the thin broken lines remains connected to the corresponding objects "a"-"h" similar to the steps S5.2 and S5.3.

FIG. 6 illustrates the selection of a selectable object 3, also labeled with the letters "a"-"e", on the touch sensitive display 2 according to a fifth embodiment of the present invention. According to FIG. 6 three steps S6.1, S6.2 and S6.3 corresponding to the steps S2.1, S2.2 and S2.3 in FIG. 2 are demonstrated. The difference between the embodiment of the FIG. 2 and FIG. 6 is, is that in FIG. 6 the selectable objects "a"-"e" are not application icons on the touch sensitive display 2, but input fields, which are distributed across different lines of a text depicted as dotted lines representing a plurality of rows. For example the first input field labeled with the letter "a" is in the first row and the last input field labeled with the letter "e" is in the fourteenth row. According to the steps S6.1 the selectable objects "a"-"e" are displayed on the touch sensitive display 2 and after performing the first touch command 4 on the touch sensitive area as circle or as an alternative embodiment on the touch sensitive display 2 (not shown), one selectable object "b" is highlighted initially and after performing a second touch command 4 according to one of the aforementioned alternatives the initially highlighted object "b" can be selected and after the selection an entry can be made (not shown). Similar to the jump to other selectable objects in FIG. 2 a jump to other selectable objects "a" or "c"-"e" in FIG. 6 according to step S6.3 can be performed after the second touch command 4 and as demonstrated in step S6.3 object "d" can be highlighted. It is clear that two jumps are performed here, that means that two times the second touch command has to be performed to jump from object "b" over object "c" to arrive at object "d".

The invention claimed is:

1. A method to perform a selection on a touch sensitive handheld electronic device having a touch sensitive display and a touch sensitive area, the method comprising:
   a) displaying a plurality of selectable objects on said touch sensitive display, said plurality of selectable objects comprising a first group of selectable objects and a spaced apart second group of selectable objects, said first group of selectable objects being spaced farther away from said touch sensitive area than said second group of selectable objects, wherein each of said plurality of selectable objects is selectable through a touch command at a position of said plurality of selectable objects on said touch sensitive display;

b) receiving a first touch command from said touch sensitive area of said handheld device to enter a highlighting mode to highlight one of said selectable objects of said first group and display said highlighted selectable object, wherein when in said highlighting mode each of said selectable objects of said first group of selectable objects can be highlighted on said touch sensitive display through use of said touch sensitive area but none of said selectable objects of said second group of selectable objects can be highlighted on said touch sensitive display through use of said touch sensitive area, wherein said first group of selectable objects and said second group of selectable objects are both concurrently displayed on said touch sensitive display when in said highlighting mode, wherein said touch sensitive area is spaced apart from said touch sensitive display so that there is no direct contact therebetween;

c) receiving a second touch command from said touch sensitive area of said handheld device to:

select said highlighted selectable object of said first group, or jump to a different selectable object of said first group, highlight said different selectable object, and display said highlighted different selectable object, wherein when said different selectable object of said first group is highlighted, the method further comprises receiving a third touch command from said touch sensitive area that selects said highlighted different selectable object.

2. The method according to claim 1, wherein a determination about which one of said selectable objects is initially highlighted depends on said position of said first touch command in order to provide sufficient space for performing further touch commands and to remain within said touch sensitive area.

3. The method according to claim 1, wherein said first touch command, said second touch command or said third touch command is at least one or a combination of the following: a single touch command, a short touch command, a tap, a double tap, a horizontal or vertical scroll, a swipe, a touch and hold, a flick, a press, or a gesture on said touch sensitive area and can be performed with at least one finger and/or with a combination of at least two fingers.

4. The method according to claim 1, wherein said highlighting is performed by using distinguishing graphical elements and/or using connecting elements having geometric forms, colors and/or patterns and/or referencing elements and/or through a modified size in order to demonstrate which objects are selectable and/or which one of said selectable objects is highlighted.

5. The method according to claim 1, wherein at least one of said touch commands is performed along a course with at least a portion having a vertical course, a horizontal course, a curved course, a circular course and/or a diagonal course.

6. The method according to claim 5, wherein said course is visualized by means of graphical elements in order to demonstrate what type of course is provided.

7. The method according to claim 6, wherein said course visualization provides a magnified view to at least a group from said selectable objects in order to increase an accuracy of said highlighting and selection of said selectable objects.

8. The method according to claim 1, wherein said plurality of selectable objects are each a program icon, an app icon, an input box, an input field, an information displayed in a row, an information displayed in a column, an email, a link or a reference.

9. A touch sensitive handheld electronic device having a touch sensitive display, wherein said device is adapted to perform the method according to claim 1.

10. The handheld electronic device according to claim 9, wherein said handheld electronic device is a smartphone, a tablet pc, a multimedia player, a wearable device, smart watch or a notebook.

11. A non-transitory computer-readable storage medium comprising instructions which, when executed by a computer, cause the computer to carry out a method according to claim 1.

12. The method according to claim 1, wherein the touch sensitive display is rectangular and the touch sensitive area is circular.

13. The method according to claim 1, wherein said touch sensitive area is separated from said touch sensitive display by a structure that is not part of said touch sensitive display.

14. A method to perform a selection on a touch sensitive handheld electronic device having a touch sensitive display and a touch sensitive area, the method comprising:

a) displaying a plurality of selectable objects on said touch sensitive display, said plurality of selectable objects comprising a first group of selectable objects and a spaced apart second group of selectable objects, said first group of selectable objects being spaced farther away from said touch sensitive area than said second group of selectable objects, wherein each of said plurality of selectable objects is selectable through a touch command on said touch sensitive display;

b) receiving a first touch command from said touch sensitive area to place said handheld device into a highlighting mode, wherein when in said highlighting mode each of said selectable objects of said first group of selectable objects can be highlighted on said touch sensitive display through use of said touch sensitive area but none of said selectable objects of said second group of selectable objects can be highlighted on said touch sensitive display through use of said touch sensitive area, wherein said first group of selectable objects and said second group of selectable objects are both concurrently displayed on said touch sensitive display when in said highlighting mode;

c) receiving a second touch command from said touch sensitive area while in said highlighting mode to highlight one of said selectable objects of said first group of selectable objects on said display screen; and d) receiving a third touch command from said touch sensitive area to select said highlight one of said selectable objects of said first group of selectable objects.

15. The method according to claim 14, wherein said touch sensitive area of said handheld device is located on said touch sensitive display or is spaced apart from said touch sensitive display.

* * * * *